(12) United States Patent
Finkelstein

(10) Patent No.: US 9,294,388 B2
(45) Date of Patent: Mar. 22, 2016

(54) SYSTEMS AND METHODS FOR ROUTING BROADBAND COMMUNICATIONS

(75) Inventor: Jeff Finkelstein, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 966 days.

(21) Appl. No.: 13/435,969

(22) Filed: Mar. 30, 2012

(65) Prior Publication Data

US 2012/0250504 A1 Oct. 4, 2012

Related U.S. Application Data

(60) Provisional application No. 61/470,513, filed on Apr. 1, 2011.

(51) Int. Cl.
*H04L 12/26* (2006.01)
*H04L 12/725* (2013.01)
*H04L 12/28* (2006.01)

(52) U.S. Cl.
CPC .......... *H04L 45/302* (2013.01); *H04L 12/2801* (2013.01); *H04L 12/2874* (2013.01)

(58) Field of Classification Search
CPC .................................................. H04L 12/2801
See application file for complete search history.

(56) References Cited

U.S. PATENT DOCUMENTS

| 2003/0037163 A1* | 2/2003 | Kitada et al. ................... 709/236 |
| 2004/0019876 A1* | 1/2004 | Dravida et al. ................ 717/117 |
| 2005/0027851 A1* | 2/2005 | McKeown et al. ............. 709/224 |
| 2005/0123001 A1* | 6/2005 | Craven et al. .................. 370/486 |

* cited by examiner

*Primary Examiner* — Dang Ton
*Assistant Examiner* — Nourali Mansoury
(74) *Attorney, Agent, or Firm* — Sutherland Asbill & Brennan LLP

(57) ABSTRACT

Systems and methods for routing broadband communications are provided. Downstream data to be communicated from a cable service provider head end system to a customer device may be received by a provider edge routing device. The downstream data may be mapped by the provider edge routing device to a physical address associated with the customer device, and the downstream data may be output by the provider edge routing device for communication to the customer device. A provider edge device separate from the provider edge routing device may receive the output downstream data. Based at least in part upon the physical address, the provider edge device may determine a port for outputting the downstream data, and the provider edge device may output the downstream data on the determined port.

18 Claims, 4 Drawing Sheets

SYSTEMS AND METHODS FOR ROUTING BROADBAND COMMUNICATIONS

CROSS-REFERENCE TO RELATED APPLICATION

This application claims priority from U.S. Provisional Patent Application No. 61/470,513, entitled "Systems and Methods for Routing Broadband Communications," filed on Apr. 1, 2011. The priority application is incorporated by reference herein in its entirety.

TECHNICAL FIELD

Aspects of the disclosure relate generally to broadband communications, and more particularly, to systems and methods that facilitate the routing of broadband communications.

BACKGROUND

Broadband service providers, such as cable service providers, typically provide a wide variety of services to any number of customers or households. Examples of provided services include television service, telephone service, and Internet service. Typically, a cable service provider utilizes one or more cable modem termination systems ("CMTSs") to facilitate the provision of broadband communications to customer devices (e.g., cable modems) and to facilitate the receipt of upstream communications from customer devices.

Within conventional cable infrastructures, a CMTS typically performs a wide variety of high-level mapping and routing functions. More particularly, the CMTS typically receives data, such as video data and/or voice data, that includes a layer three ("L3") address. The L3 address is typically an IP address of a customer device, and the CMTS must map the L3 address to a layer two ("L2") address for the customer device. For example, a conventional CMTS typically maps IP addresses to physical addresses, such as Media Access Control ("MAC") addresses. A conventional CMTS also typically identifies a quality of service ("QOS") or priority associated with various communications and determines a sequence for routing data packets based upon the quality of service.

As a result of the functionalities performed by conventional CMTS devices, these devices are becoming increasingly complex and costly. Additionally, next generation converged multi-service access platform ("CMAP") devices, which are configured to handle video communications in addition to data communications, are being developed as relatively complex devices. As new functionality is being added to CMTS devices and CMAP devices, the cost and size of these devices are increasing. Additionally, a wide variety of engineering challenges are being encountered as new features, such as Digital Program Insertion ("DPI"), are added to the devices. Accordingly, an opportunity exists for improved systems, methods, architectures, apparatus, and devices that facilitate the routing of broadband communications.

BRIEF DESCRIPTION

Some or all of the above needs and/or problems may be addressed by certain embodiments of the disclosure. Embodiments of the disclosure may include systems and methods for routing broadband communications. In one embodiment, a method for routing broadband communications is provided. Downstream data to be communicated from a cable service provider head end system to a customer device may be received by a provider edge routing device. The downstream data may be mapped by the provider edge routing device to a physical address associated with the customer device, and the downstream data may be output by the provider edge routing device for communication to the customer device. A provider edge device separate from the provider edge routing device may receive the output downstream data. Based at least in part upon the physical address, the provider edge device may determine a port for outputting the downstream data, and the provider edge device may output the downstream data on the determined port.

In accordance with another embodiment, a broadband communication system is provided. The broadband communication system may include a provider edge device and a provider edge routing device separate from the provider edge device. The provider edge device may be configured to utilize a physical address to perform media conversion on data communicated between a customer device and a cable service provider head end system. The provider edge routing device may be configured to (i) receive downstream data to be communicated to the customer device, (ii) map the received downstream data to the physical address associated with the customer device, and (iii) output the downstream data for communication to the customer device, wherein the downstream data is subsequently processed by the provider edge device.

Additional systems, methods, apparatus, features, and aspects may be realized through the techniques of various embodiments of the disclosure. Other embodiments and aspects of the disclosure are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
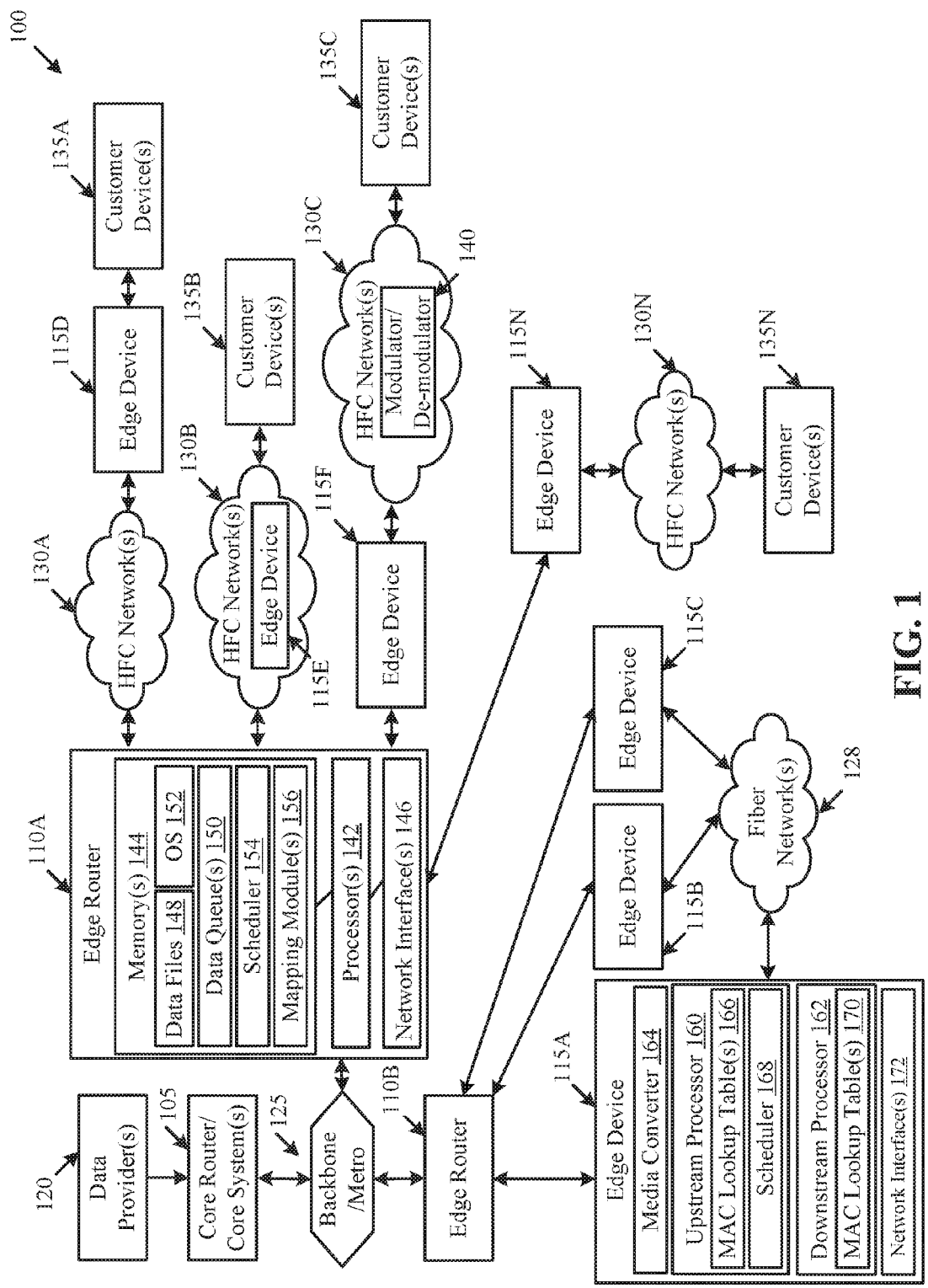
FIG. 1 illustrates a block diagram of an example system for providing broadband communications in accordance with various embodiments of the disclosure.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure may include systems, methods, architectures, apparatus, and devices for routing broadband communications. In certain embodiments, the components of a conventional provider edge device, such as a CMTS or a CMAP device, may be simplified by distributing certain functionality between a provider edge routing device and a separate provider edge device. For example, the conversion or mapping of virtual or layer 3 ("L3") addresses to physical or layer 2 ("L2") addresses may be accomplished by a provider edge routing device. In other words, the provider edge routing device may convert a virtual address (e.g., an Internet Protocol or "IP" address) into a physical address (e.g., a Media Access Control ("MAC") address or other physical address). The provider edge device may then utilize the physical address to facilitate the communication of data output by the provider edge routing device to a customer device. For example, the provider edge device may utilize the physical address to output data onto a hybrid fiber coaxial ("HFC") network or onto a fiber node via an appropriate port identified based at least in part on the physical address. By separating the functional mapping of virtual to physical addresses, the inherent complexity of the provider edge device may be reduced to that of an L2 bridge coupled with media conversion functionality.

As a result of the reduced complexity, the cost of the provider edge device may be reduced. Accordingly, infrastructure cost savings may be achieved by a cable service provider. For example, it is estimated that up to a ninety percent savings may be obtained for the equipment utilized to service a group of households. Additionally, space at a cable head end may be conserved. For example, the size of a provider edge device may potentially be reduced from approximately a cabinet's worth of equipment utilized to service a group of households to a relatively small card. As a result of decreasing the size and complexity of the provider edge device, the provider edge device may also be incorporated into other components of an HFC distribution network (or other network). For example, the provider edge device may be incorporated into a fiber node situated between a cable head end and a plurality of customer devices.

I. Structural Overview

A first example system 100 or infrastructure for routing broadband communications will now be described illustratively with respect to FIG. 1. The system 100 may include a core router 105, any number of edge routers 110A, 110B or edge routing devices, and/or any number of provider edge devices 115A-N. For purposes of this disclosure, the provider edge devices 115A-N may also be referred to as layer 2 or L2 bridge devices. Additionally, according to an aspect of the disclosure, the edge routers 110A, 110B and the provider edge devices 115A-N may be separate devices. In this regard, address mapping and media conversion functionalities may be separated. As a result, significant cost and space savings may be achieved.

In one example operation, any number of data providers 120 may facilitate the communication of data (e.g., video data, Internet data, etc.) to the core router 105. Additionally, any number of backbone and/or metropolitan area networks 125 may facilitate the communication of data from the core router 105 to various edge routers 110A, 110B. For example, a backbone network 125 may facilitate communication of data to various head end systems associated with a cable service provider. Once data is processed by an edge router 110A, 110B and a provider edge device 115A-N, the data may be provided to a suitable distribution network, such as one or more fiber networks 128 or one or more HFC networks 130A-N, for communication to any number of customer devices 135A-N.

With reference to FIG. 1, the core router 105 and/or any number of associated core systems may be configured to receive and process data from any number of data providers 120 or content providers. For example, if a cable customer utilizes a customer device (generally referred to as customer device 135) to order a movie from a data provider 120, data associated with a video stream may be received from the data provider 120 by the core router 105. The core router 105 may utilize label switching or another suitable technique to place the data within an appropriate label switched path. For example, the core router 105 may utilize Multiprotocol Label Switching ("MPLS") to place the received data in an appropriate label switched path that will result in the downstream transmission of the data to an appropriate edge router (generally referred to as edge router 110). As one example, the core router 105 may analyze data packet headers to identify one or more labels for routing the data, and the labels may be utilized to place the data into an appropriate label switched path. Similarly, the core router 105 (or a plurality of core routers) may place television channels and/or other content in appropriate label switched paths that will result in the downstream transmission of the data to any number of appropriate edge routers 110A, 110B. In certain embodiments, one or more core routers 105 may place data onto a service provider backbone network 125, and various head end devices may pull desired data off of the backbone network 125 for downstream transmission to customers. Certain data may be shared among a multitude of head end devices, and therefore, processed by multiple edge routers 110A, 110B. Other data may be communicated directly to a specific edge router.

Additionally, in certain embodiments, the core router 105 may identify and/or assign a quality of service ("QOS") to certain processed data. A quality of service designation may be utilized during the subsequent processing of the data. For example, an edge router 110 may utilize a QOS designation to schedule the output of data packets for communication to a customer device 135. According to an aspect of the disclosure, a wide variety of QOS designations may be utilized to facilitate enhanced scheduling control. For example, eight (8) different QOS levels may be utilized. The hierarchy of these QOS levels from least important to most important may be: a basic effort level, a basic metro Ethernet level, a reserved level, a metro real time level, a video level, a voice level, a signaling level, and a timing level. It will be appreciated that these levels are provided by way of example only, and any number of other levels and/or hierarchies may be utilized. In certain embodiments, an identification of a QOS level may be included in one or more data bits within a header of the data packets. In this regard, a priority associated with the data packets may be identified by an edge router 110 and utilized during scheduling.

In certain embodiments, one or more backbone networks and/or metropolitan area networks (or metro networks) 125 may be utilized to facilitate the communication of data from the core router 105 to any number of appropriate edge routers 110A, 110B and/or various head end systems associated with the edge routers 110A, 110B. As desired, the data and/or relevant data providers 120 may be authenticated prior to the data reaching the edge routers 110A, 110B. For example, a core router 105, other core systems, and/or a separate authentication system may authenticate data and/or data providers 120 prior to data being communicated onto a backbone network 125 accessible by various head end systems.

With continued reference to FIG. 1, any number of edge routers, such as edge routers 110A, 110B, may be included in the system 100. Each edge router 110 may be configured to output downstream data for delivery to any number of customer devices 135A-N. Additionally, each edge router 110 may be configured to receive upstream data from provider edge devices 115A-N and route the received upstream data to a recipient, such as the core router 105 and/or a data provider 120. During the processing of data, the edge router 110 may be configured to convert or map L3 address data into L2 address data and vice versa.

In one example operation, for downstream communications, an edge router 110 may be configured to receive data packets that include virtual addresses, such as an IP address or other L3 address. The edge router 110 may map the virtual address for a data packet (or group of data packets) to a physical device address, such as a MAC address. In certain embodiments, one or more mapping tables may be utilized by the edge router 110 to map an L3 address to an L2 address.

Additionally, in certain embodiments, an edge router 110 may be configured to identify or determine a QOS for various data. For example, a QOS designation may be identified based upon an evaluation of header information included in a data packet. As another example, a QOS designation may be determined based upon a type of communication and/or a designated recipient. Additionally, the edge router 110 may utilize QOS information to schedule downstream data packets for output to various customer devices 135A-N. In certain embodiments, downstream data packets may be placed into one or more queues or other data structures, such as respective queues associated with each household (and/or customer device) serviced by the edge router 110. The QOS information may be utilized during the placement and/or scheduling of data packets into household queues, as well as during the placement of data packets from the various household queues into an output queue. Once downstream data is placed in an output queue, the data may be output for delivery to various customer devices 135A-N. Following the output of the downstream data, the data may be received and processed by one or more provider edge devices 115A-N as described in greater detail below.

As one example operation for processing upstream data, an edge router 115 may receive upstream data that has been output by customer devices 135A-N and processed by provider edge devices 115A-N. The edge router 110 may be configured to convert L2 addresses to L3 addresses for received upstream data packets. Additionally, in certain embodiments, the edge router 110 may be configured to determine QOS designations for upstream data packets. In other embodiments, a provider edge device 115 or a customer device 130 may determine a QOS designation for an upstream data packet, and the edge router 110 may identify the QOS designation. As desired, the QOS designation may be utilized by the edge router 110 to facilitate the scheduling of upstream data packets that are output for communication to an upstream recipient, such as the core router 105.

As desired in various embodiments, an edge router 110 may utilize a wide variety of suitable routing protocols. Example protocols include, but are not limited to, a Routing Information Protocol ("RIP"), an Open Shortest Path First ("OSPF") protocol, a Border Gateway Protocol ("BGP"), an Intermediate System-Intermediate System ("IS-IS") protocol, a Multiprotocol Label Switching ("MPLS"), a Label Distribution Protocol ("LDP"), an L2 Virtual Private Network ("L2VPN") protocol, an L3VPN protocol, and/or other layer 2 and/or layer 3 protocols.

The components of an example edge router 110, such as edge router 110A, will now be described. In certain embodiments, the edge router 110 may be a suitable processor-driven device configured to facilitate conversions between virtual addresses and physical addresses, as well as the scheduling of data packets for output. Examples of suitable processor-driven devices that may be utilized as an edge router 110 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the edge router 110 may form a special-purpose computer or other particular machine that is operable to facilitate address conversion and/or scheduling of data packets to be output.

In addition to one or more processors 142, the edge router 110 may include one or more memory devices 144 and/or one or more network interfaces 146. The processors 142 may be configured to execute any number of software applications and/or computer-readable or computer-executable instructions. The memory devices 144 (also referred to as memory 144) may include any number of suitable memory devices, such as caches, read-only memory devices, random access memory devices, flash memory devices, magnetic storage devices, etc. The memory devices 144 may store data, executable instructions, and/or various program modules utilized by the processors 142. Examples of data that may be stored by the memory devices 144 include data files 148 and/or any number of suitable data queues 150. Additionally, the memory devices 144 may be configured to store any number of suitable program modules and/or applications that may be executed by the processors 142, such as an operating system ("OS") 152, a scheduler 154, and/or one or more mapping modules 156.

The data files 148 may include any suitable data that facilitates the operation of the edge router 110, the conversion of addresses, the scheduling of data packets, and/or communication with other components of the system 100. For example, the data files 148 may include, but are not limited to, customer information, identification information for customer devices 135A-N, mapping information associated with the conversion of addresses, quality of service processing information, etc. The data queues 150 may include any number of suitable data structures configured to store data prior to the output of the data. In certain embodiments, a respective data queue may be associated with each customer device 135A-N, although other data queue arrangements may be utilized. During the scheduling of data for downstream output, QOS information may be evaluated and utilized to facilitate the addition of data to various data queues. Additionally, in certain embodiments, data may be read from customer data queues and added to one or more suitable output queues. In this regard, the downstream data may be added to a broadband data stream for delivery to any number of customer devices 135A-N. As desired in various embodiments, upstream data may also be scheduled into one or more queues for delivery to suitable upstream recipient devices.

The OS 152 may be a suitable software module that controls the general operation of the edge router 110. The OS 152 may also facilitate the execution of other software modules by the processors 142, for example, the scheduler 154 and/or the mapping modules 156. The scheduler 154 may include any number of suitable modules and/or applications that facilitate the scheduling of data for output. In operation, the scheduler 154 may utilize any number of suitable scheduling algorithms and/or routing protocols to facilitate the storage of data into the data queues 150, as well as the output of data for communication to customer devices 135A-N and/or other recipients. In certain embodiments, the scheduler 154 may identify and/or determine QOS information associated with various data packets, and the scheduler 154 may schedule output of the data based at least in part upon the QOS information. For example, certain data may be prioritized based upon an evaluation of a QOS indication. Additionally, in embodiments in which the scheduler 154 determines a QOS indication, a wide variety of suitable methods and/or techniques may be utilized to determine a QOS indication. For example, a type of data included in the data packet may be identified and processed to determine the QOS indication. As another example, a designated recipient for data may be evaluated in order to determine a QOS indication. Indeed, a wide variety of different operations may be performed by the scheduler 154 as desired, and the operations described above are provided by way of example only.

The mapping modules 156 may include any number of suitable software modules and/or applications that facilitate the mapping of virtual addresses (or L3 addresses) to physical addresses (or L2 addresses) and vice versa. In operation, the mapping modules 156 may identify an address included in received data. The mapping modules 156 may then access one or more suitable mapping tables in order to map the identified address to another address. For example, with downstream data, the mapping modules 156 may receive data that includes an IP address for a customer device 135, and the mapping modules 156 may utilize the mapping tables to map or convert the IP address into a physical address (e.g., a MAC address) for the customer device 135. Similarly, with upstream data, the mapping modules 156 may receive data that includes a physical address for a recipient device, and the mapping modules 156 may map the physical address into a virtual address for the recipient device. Once address conversion has been completed by the mapping modules 156, the data may be processed by the scheduler 154 and/or output by the edge router 110.

With continued reference to the edge router 110, one or more network interfaces 146 may facilitate connection of the edge router 110 to one or more suitable networks that facilitate communications with other components of the system 100. For example, the network interfaces 146 may facilitate connection of the edge router 110 to the backbone network 125, the fiber networks 128, and/or the HFC networks 130A-N.

With continued reference to FIG. 1, any number of provider edge devices 115A-N or layer 2 bridges may be included in the system 100. Each provider edge device 115 may be configured to facilitate the processing of communications (e.g., downstream communications, upstream communications) between an edge router 110 and any number of customer devices 135A-N. In certain embodiments, a provider edge device 115 may be transparent to an edge router 110 and/or a customer device 135. For example, an edge router 110 may output data for communication to one or more customer devices 135, and the data may be processed by the provider edge device 115 prior to delivery to a customer device 135.

Additionally, a wide variety of different types of provider edge devices 115 may be utilized as desired in various embodiments of the disclosure, such as CMTS devices and/or CMAP devices. As desired, a provider edge device may modulate or otherwise process data prior to outputting the data onto a fiber network 128, an HFC network 130, or another network. For example, data may be modulated by the provider edge device 115 prior to the data being communicated or output for communication to a fiber node associated with the HFC network 130. In other embodiments, modulation and/or de-modulation devices may be provided as separate devices in communication with a provider edge device 115.

As desired, a wide variety of different provider edge device configurations may be utilized in various embodiments. As one example, one or more provider edge devices, such as devices 115A, 115B, 115C, may process (e.g., perform media conversion, etc.) data that is output onto one or more fiber networks 128. As another example, one or more provider edge devices, such as provider edge devices 115F, 115N, may process data that is output onto one or more HFC networks 130C, 130N for delivery to one or more customer devices 135C, 135N. Certain example provider edge devices, such as provider edge device 115N, may perform media conversion on processed data. Other example provider edge devices, such as provider edge device 115F, may be separate from one or more modulators and/or de-modulators 140 that perform media conversion, such as modulators and/or de-modulators associated with an HFC network 130C. In this regard, a provider edge device 115F may communicate data (e.g., downstream data) onto appropriate ports and/or networks for delivery to one or more customer devices 135C, and modulation may be performed by a separate modulator 140. Similarly, de-modulated data may be received and processed by the provider edge device 115F.

In certain embodiments, a provider edge device may be situated at or near a service provider head end. In other embodiments, a provider edge device may be situated remotely from a service provider head end. For example, one or more provider edge devices 115D may be situated at or near an interface between an HFC network 130A and one or more customer devices 135A. For example, a provider edge device 115D may be situated at a cable tap prior to the delivery of data to a household and/or receipt of upstream data from the household. As another example, one or more provider edge devices 115E may be incorporated into an HFC network 130B that facilitates communications with one or more customer devices 135B. For example, a provider edge device 115E may be incorporated into a fiber node or other suitable component included in the HFC network 130B. Indeed, a wide variety of different arrangements and/or configurations for provider edge devices 115 may be utilized, and the configurations illustrated in FIG. 1 are provided by way of example only.

According to an aspect of the disclosure, the complexity and/or functionality of a provider edge device 115 may be relatively simplified. For example, L3 to L2 address mapping functionality and scheduling functionality may be removed from a provider edge device 115. In certain embodiments, a provider edge device 115 may be configured to function as a bridge between an edge router 110 and one or more customer devices 135. In one example operation, when downstream data is received by a provider edge device 115, the L2 address associated with the downstream data may be utilized by the provider edge device to identify a customer device 135 and output the data to an appropriate port for communication to the customer device 135 via a fiber network 138, an HFC network 130, or other suitable network. When upstream data is received by the provider edge device 115 from a customer device 135 via an HFC network 130, the provider edge device 115 may identify, determine, and/or mark the upstream data with an appropriate QOS indicator, and the provider edge device 115 may provide the upstream data to an edge router 110. In certain embodiments, the provider edge device 115 may schedule upstream information for delivery to an edge router 110.

In certain embodiments, a customer device 135 may mark upstream data packets with an appropriate QOS indicator. These marked packets will then be used by the provider edge device 115 and/or the edge router 110 to facilitate scheduling and mapping of the upstream data in relation to other packets that may or may not contain QOS indicators. In other embodiments, the provider edge device 115 may determine QOS indicators for data, for example, by evaluating a type of data, a designated recipient of the data, and/or an originator of the data.

Various embodiments of the disclosure may provide relatively simple provider edge devices 115. As a result of reducing the complexity of the provider edge devices 115, the cost and/or size of the provider edge devices 115 may be reduced. Accordingly, infrastructure cost savings may be achieved by a cable service provider. Estimates for these cost savings are as high as 90%. Additionally, space at a cable head end may be conserved. For example, the size of a provider edge device 115 may potentially be reduced from approximately a cabinet's worth of equipment utilized to service a group of customer devices 135 to a relatively small card. As a result of decreasing the size and complexity of the provider edge device 115, the provider edge device 115 may alternatively be incorporated into one or more components of a hybrid fiber cable ("HFC") distribution network or another distribution network. For example, a provider edge device 115 may be incorporated into a fiber node situated between a cable head end and a plurality of customer devices 135.

The components of an example provider edge device 115, such as provider edge device 115A, will now be described. In certain embodiments, the provider edge device 115 may be a suitable processor-driven device configured to process communicated data and, in certain embodiments, perform media conversion with respect to the data. For example, the provider edge device 115 may include an application-specific circuit, a microcontroller, a minicomputer, another processor-based device, and/or any combination of processor-driven devices. In certain embodiments, a provider edge device 115 may include separate components (e.g., cards, chassis, etc.) for processing downstream data and upstream data. Additionally, the execution of suitable computer-implemented instructions or computer-executable instructions by the provider edge device 115 may form a special-purpose computer or other particular machine that is operable to facilitate the processing of data and/or media conversion.

In addition to any number of processing and/or memory components, which may be similar to those described above for the edge router 110, the example provider edge device 115 may include, but is not limited to, an upstream processor 160 or upstream processing component, a downstream processor 162 or downstream processing component, and, in certain embodiments, a media converter 164. As set forth above, separate downstream and upstream processing components may be utilized. Alternatively, a single processing component may be utilized to process both downstream and upstream data.

The upstream processor 160 may include any number of suitable software components that facilitate the processing of upstream data. Additionally, as illustrated, the upstream processor 160 may include, for example, one or more stored physical address (e.g., MAC) lookup tables 166 and/or a scheduler 168. Once upstream data is received by the upstream processor 160, the upstream processor 160 may identify a physical address (e.g., a destination address) included in or associated with the data. The upstream processor 160 may then access the physical address lookup tables 166 utilizing the physical address in order to determine or identify a port or network associated with a designated recipient. The upstream processor 160 may then direct the output of the data to the appropriate port and/or onto an appropriate network. As an alternative to determining an output port, the upstream processor 160 may utilize default routing rules to process upstream data. For example, all received upstream data may be output for delivery to a designated edger router 110.

The scheduler 168, which may be optional in certain embodiments, may facilitate the scheduling of upstream data packets for delivery to an edge router 110. In certain embodiments, the upstream data may be communicated in a point-to-point manner. Accordingly, the scheduler 168 may schedule upstream data packets for delivery to one or more edge routers 110. In one example embodiment, upstream data may be stored in a data queue (or distributed among data queues for various edge routers), and data included in the data queue may be output for upstream delivery to at least one edge router 110. As desired, the scheduler 168 may identify and/or determine QOS indications for various data, and the QOS indications may be evaluated during the storage of data in the data queue and/or during the selection of data to be output for delivery to at least one edge router.

Similar to the upstream processor 160, the downstream processor 162 may include any number of suitable software components that facilitate the processing of downstream data. Additionally, as illustrated, the downstream processor 162 may include, for example, one or more stored physical address (e.g., MAC) lookup tables 170. The lookup tables 170 may be the same or different from the lookup tables 166 described above with reference to the upstream processor 160. Once downstream data is received by the downstream processor 162, the downstream processor 162 may identify a physical address (e.g., a destination address) included in or associated with the data. The downstream processor 162 may then access the physical address lookup tables 170 utilizing the physical address in order to determine or identify a port or network associated with a recipient customer device 135. Additionally, certain data (e.g., general television content, etc.) may be designated for delivery to a multitude of customer devices. The downstream processor 162 may then direct the output of the data to the appropriate port and/or onto an appropriate network.

The media converter 164 may perform a wide variety of suitable conversions and/or processing on upstream and/or downstream data. In this regard, the media converter 164 (or converters) may make it possible to connect dissimilar media types such as Ethernet cables, fiber optic cables, and/or coaxial cables. Indeed, a wide variety of different types of media converters may be utilized. Additionally, although a single media converter 164 is illustrated, separate converters may be provided for the upstream and downstream processors 160, 162. Alternatively, media conversion (e.g., modulation, de-modulation, etc.) may be performed by separate components of the system 100. For example, the provider edge device 115 may support the Data Over Cable Service Interface Specification ("DOCSIS") External Physical Layer interface and/or Universal Edge Quadrature Amplitude Modulation ("QAM") protocols.

The provider edge device 115 may additionally include one or more network interfaces 172 that facilitate connection of the provider edge device 115 to one or more suitable networks that facilitate communications with other components of the system 100. For example, the network interfaces 172 may facilitate connection of the provider edge device 115 to any number of fiber networks 128 and/or HFC networks 130A-N.

In certain embodiments, the provider edge device 115 may additionally be capable of generating and/or determining an internal timing signal. For example, a crystal oscillator or other timing device may be incorporated into the provider edge device 115 and utilized to maintain device timing. As another example, a suitable timing signal may be received from any number of suitable timing sources. The timing signal may be utilized by the provider edge device 115 to synchronize the processing and output of downstream and upstream data. It is not necessary for the provider edge device 115 to support the DOCSIS timing interface. Additionally, the provider edge device 115 may support a wide variety of suitable protocols. Example protocols include, but are not limited to, a Routing Information Protocol ("RIP"), an Open Shortest Path First ("OSPF") protocol, a Border Gateway Protocol ("BGP"), an Intermediate System-Intermediate System ("IS-IS") protocol, a Multiprotocol Label Switching ("MPLS"), a Label Distribution Protocol ("LDP"), an L2 Virtual Private Network ("L2VPN") protocol, an L3VPN protocol, and/or other layer 2 and/or layer 3 protocols.

With continued reference to FIG. 1, the fiber networks 128 may include any number of suitable networks configured to deliver data between a service provider head end and any number of recipient devices. Similarly, the HFC networks 130A-N may include any combination of optical fibers, fiber nodes, coaxial cables, amplifiers, and/or cable taps configured to communicate signals between a service provider head end and/or a provider edge device 115 and one or more customer devices 135 (e.g., cable modems, etc.). Additionally, the customer devices 135A-N may include any suitable devices configured to receive downstream communications via the various networks 128, 130 and/or configured to output upstream communications to various networks 128, 130. For example, the customer devices 135 may include cable modems, home routing devices, and/or other customer termination devices.

The system 100 illustrated in FIG. 1 is provided by way of example only. It will be appreciated that other systems having more or less than the components illustrated in FIG. 1 may be provided in accordance with various embodiments of the disclosure.

Operational Overview

Figure 2:
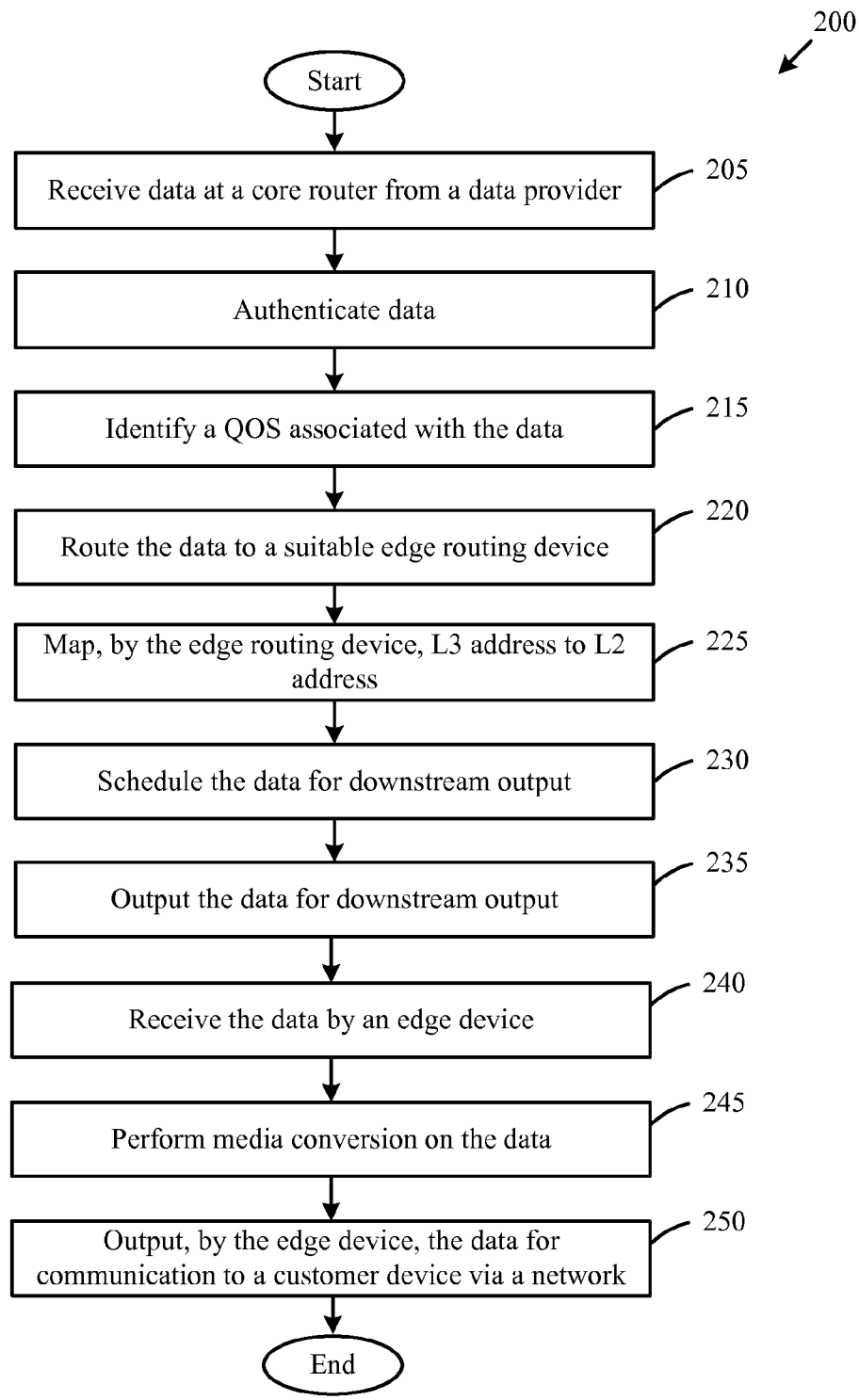
FIG. 2 is a flow diagram of an example method for providing a downstream communication to a customer device, according to an illustrative embodiment of the disclosure.

FIG. 2 is a flow diagram of an example method 200 for providing a downstream communication to a customer device, according to an illustrative embodiment of the disclosure. The method 200 illustrated in FIG. 2 is a method for providing a forward path or downstream signal to a customer device utilizing a suitable service provider infrastructure or system, such as the system 100 illustrated in FIG. 1.

The method 200 may begin at block 205. At block 205, data may be received by a core router, such as the core router 105 illustrated in FIG. 1, from a data provider or other source. Alternatively, data may be generated by a service provider. The data may include an L3 address that identifies a recipient by a virtual address, such as an IP address. At block 210, at least a portion of the data and/or an originator of the data may be authenticated and/or verified by the core router 105 or another core system.

At block 215, which may be optional in certain embodiments of the invention, the core router 105 may identify and/or determine a QOS associated with the data, and the core router 105 may mark the data with the QOS. In other embodiments, another device, such as an edge router 110, may identify a QOS and appropriately mark the data. A QOS indication may be utilized to facilitate scheduling of the data for downstream delivery.

At block 220, the core router 105 may route the data for downstream communication to a suitable edge routing device, such as the edge router 110 illustrated in FIG. 1. In certain embodiments, the core router 105 may place the data onto an appropriate label switched path that facilitates communication of the data to the edge router 110. Alternatively, data may be placed within a data feed or data stream that is accessible by the edge router 110 and/or various head end systems associated with the service provider.

At block 225, the edge router 110 may receive the data, and the edge router 110 may map the received L3 data to L2 data. For example, the edge router 110 may utilize one or more suitable mapping tables and/or databases to identify a physical address (e.g., a MAC address) associated with a customer device that is the intended recipient of the data. Additionally, at block 230, the edge router 110 may utilize a QOS associated with the data to identify a priority for communicating the data and to schedule the output of the data for communication to the customer device (or a multitude of customer devices). Based at least in part upon the scheduling, the data may be output for communication to a customer device at block 235.

At block 240, a provider edge device, such as one of the provider edge devices 115 illustrated in FIG. 1, may receive the data. The provider edge device 115 may identify a customer device, such as one of the customer devices 135 illustrated in FIG. 1, for communication of the data. As desired, the provider edge device 115 may perform media conversion, modulate, and/or otherwise format the data at block 245 for communication to the customer device 135. Additionally, the provider edge device 115 may utilize the physical address of the customer device 135 to identify a port and/or network that facilitates delivery of the data to the customer device 135. In other embodiments, one or more separate modulation components may be provided. The provider edge device 115 may then output the data for communication to the customer device 135 via a suitable network, such as an HFC network, at block 250. The method 200 may end following block 250.

Figure 3:
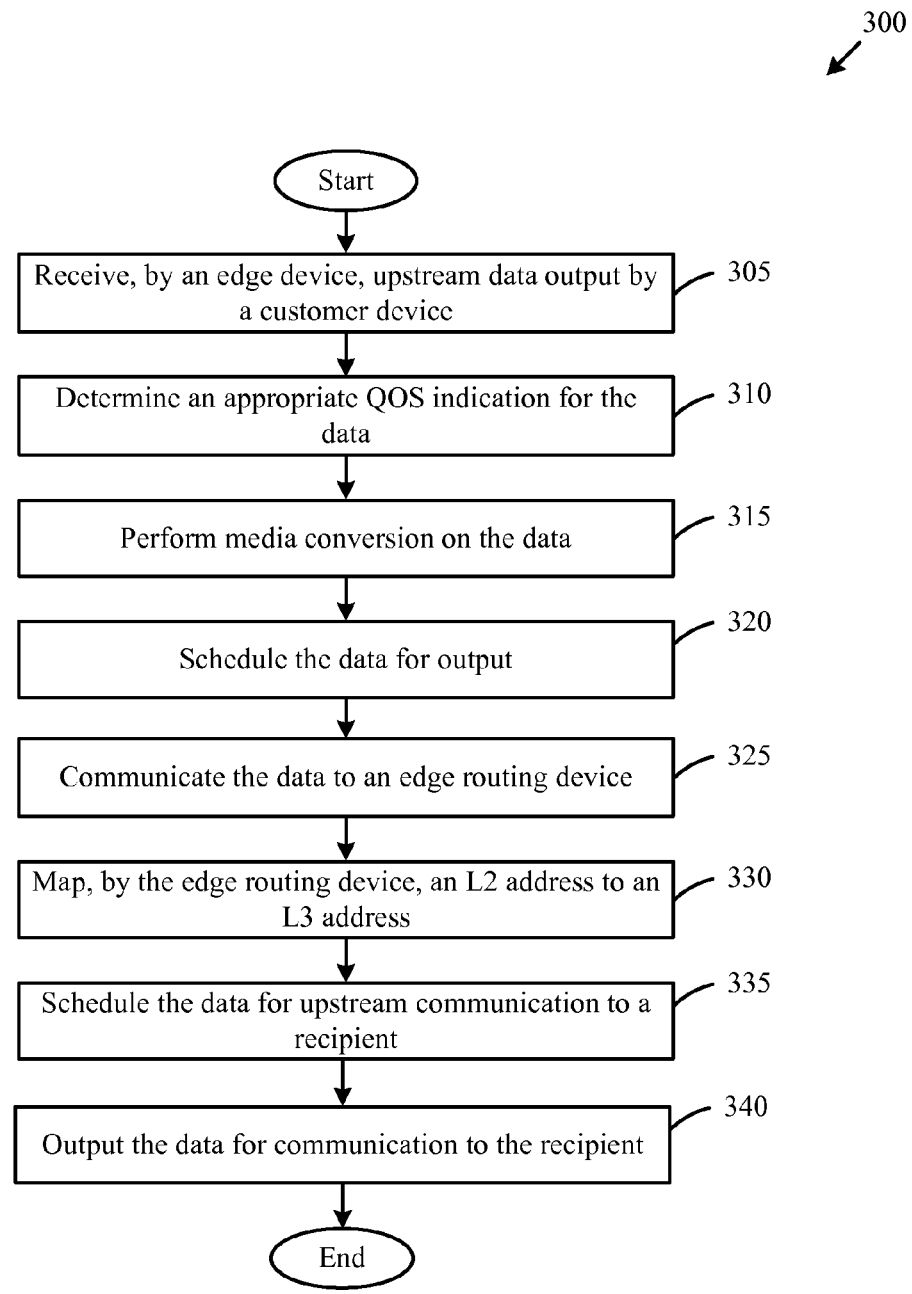
FIG. 3 is a flow diagram of an example method for receiving an upstream communication from a customer device, according to an illustrative embodiment of the disclosure.

FIG. 3 is a flow diagram of an example method 300 for receiving an upstream communication from a customer device, according to an illustrative embodiment of the invention. The method 300 illustrated in FIG. 3 is a method for providing an upstream signal from a customer device to a recipient utilizing a suitable service provider infrastructure or system, such as the system 100 illustrated in FIG. 1.

The method 300 may begin at block 305. At block 305, upstream data may be received by a provider edge device or L2 bridge device, such as one of the provider edge devices 115 illustrated in FIG. 1. The data may be data that is output by a suitable customer device serviced by the provider edge device 115, such as one of the customer devices 135 illustrated in FIG. 1. Additionally, the data may be received via any number of suitable networks, such as a suitable fiber network or a suitable HFC network.

At block 310, the provider edge device 115 may identify and/or determine a suitable QOS indication (e.g., a transmission priority) for the upstream data. In certain embodiments, the provider edge device 115 may identify a QOS indication established by the customer device 135. In other embodiments, the provider edge device 115 may evaluate the data (e.g., a type of data, etc), parameters associated with the customer device 135, and/or parameters associated with an intended recipient in order to determine a QOS indication for the data.

At block 315, which may be optional in certain embodiments, the provider edge device 115 may perform media conversion, modulate, and/or otherwise format the data for communication to an edge router, such as one of the edge routers 110 illustrated in FIG. 1. Additionally, the provider edge device 115 may utilize a physical address associated with a designated recipient to identify a port and/or network that facilitates delivery of the data to a suitable edge router, such as one of the edge routers 110 illustrated in FIG. 1. In other embodiments, the provider edge device 115 may default to routing the data to a particular edge router.

At block 320, the provider edge device 115 may utilize a QOS associated with the upstream data to identify a priority for communicating the data and to schedule the output of the data for communication to the edge router 110. Based at least in part upon the scheduling, the data may be output for communication to the edge router 110 at block 325.

At block 330, the edge router 110 may receive the upstream data, and the edge router 110 may map physical addresses or L2 addresses associated with the upstream data to virtual addresses or L3 addresses. For example, the edge router 110 may utilize one or more suitable mapping tables and/or databases to identify a virtual address associated with an intended recipient of the data. Additionally, at block 335, the edge router 110 may utilize the QOS associated with the data to schedule the communication of the data to a recipient device, such as the core router 105 illustrated in FIG. 1. Based upon the scheduling, the data may be output for communication to a recipient device at block 340. The method 300 may end following block 340.

Figure 4:
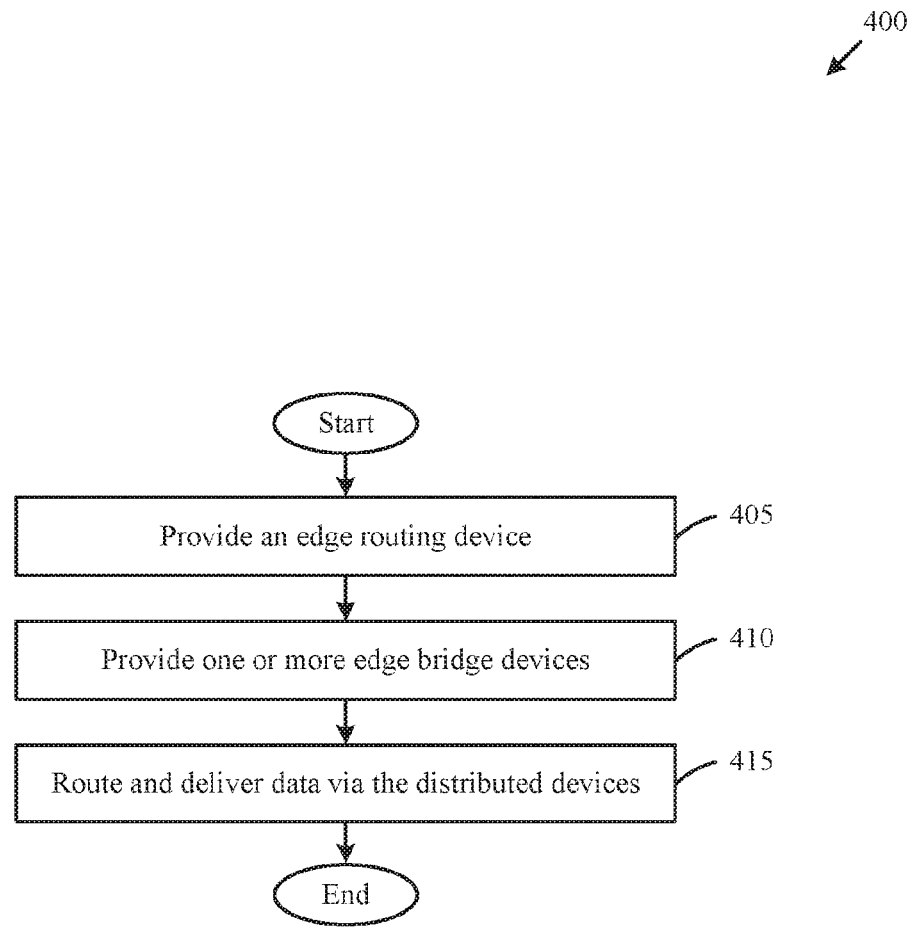
FIG. 4 is a flow diagram of an example method for separating routing and data mapping functionality in a cable network, according to an illustrative embodiment of the disclosure.

FIG. 4 is a flow diagram of an example method 400 for separating routing and data mapping functionality in a cable network, according to an illustrative embodiment of the disclosure. In accordance with the method 400, separate devices or components may be provided for mapping virtual addresses to physical addresses (and vice versa) and for performing media conversion and/or bridging functionality. The method 400 may begin at block 405.

At block 405, an edge routing device, such as one of the edge routers 110 illustrated in FIG. 1, may be provided. The edge router 110 may facilitate the evaluation of downstream data and the conversion of virtual addresses included in the downstream data to physical addresses associated with designated recipients (e.g., customer devices) for the downstream data. Additionally, the edge router 110 may facilitate the evaluation of upstream data and the conversion of physical addresses included in the upstream data to virtual addresses associated with designated recipients for the upstream data.

At block 410, one or more edge bridge devices or provider edge devices, such as the provider edge devices 115A-N illustrated in FIG. 1, may be provided. The edge devices 115A-N may facilitate the processing of downstream and upstream data and, as desired, media conversion associated with the data. For example, an edge device 115 may utilize a received physical address to identify a port on which data should be output. Additionally, with respect to upstream data, the edge device 115 may schedule the output of the upstream data.

At block 415, a wide variety of data packets may be routed and delivered to various recipients via the distributed edge routers 110 and provider edge devices 115A-N. As a result of the distributed nature of the components, the cost of provider edge devices may be reduced. Accordingly, infrastructure cost savings may be achieved by a cable service provider. Additionally, space at a cable head end may be conserved. For example, the size of a provider edge device may potentially be reduced from approximately a cabinet's worth of equipment utilized to service a group of households to a relatively small card. As a result of decreasing the size and complexity of the provider edge device, the provider edge device may also be incorporated into other components of an HFC or other distribution network. For example, the provider edge device may be incorporated into a fiber node situated between a cable head end and a plurality of customer devices.

The operations described and shown in the methods 200, 300, 400 of FIGS. 2-4 may be carried out or performed in any suitable order as desired in various embodiments of the disclosure. Furthermore, in certain embodiments, less than or more than the operations described in FIGS. 2-4 may be performed.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
receiving, by a provider edge routing device, downstream data to be communicated from a cable service provider head end system to a customer device;
mapping, by the provider edge routing device, the downstream data to a physical address associated with the customer device;
determining, by the provider edge routing device, a quality of service (QOS) indicator associated with the downstream data, the QOS indicator being determined based on an evaluation of a designated recipient for the downstream data;
identifying, by the provider edge routing device, a priority for communicating the downstream data to the physical address associated with the customer device using the (QOS) indicator associated with the downstream data;
scheduling, by the provider edge routing device and based at least in part on the identified priority, an output of the downstream data to the physical address associated with the customer device;
outputting, by the provider edge routing device, the downstream data for communication to the customer device;
receiving, by a provider edge device separate from the provider edge routing device, the output downstream data;
determining, by the provider edge device based at least in part upon the physical address, a port for outputting the downstream data; and
outputting, by the provider edge device and based at least in part on scheduling the output of the downstream data, the downstream data on the determined port.

2. The method of claim 1, further comprising:
performing, by the provider edge device, a media conversion of the downstream data based at least in part upon the determined port.

3. The method of claim 1, wherein the provider edge device is incorporated into one of (i) a hybrid fiber coaxial network configured to facilitate communications between the cable provider head end system and the customer device or (ii) a fiber optic node.

4. The method of claim 1, wherein the provider edge device comprises one of (i) a cable modem terminal system or (ii) a converged multi-service access platform.

5. The method of claim 1, wherein mapping the downstream data to the physical address comprises mapping the downstream data from a virtual address to the physical address.

6. The method of claim 1, wherein mapping the downstream data to the physical address comprises mapping the downstream data to a media access control (MAC) address.

7. The method of claim 1, further comprising:
receiving, by the provider edge device, upstream data output by the customer device;
identifying, by the provider edge device, the provider edge routing device as a destination for outputting the upstream data; and
outputting, by the provider edge device, the upstream data for communication to the provider edge routing device.

8. The method of claim 7, further comprising:
receiving, by the provider edge routing device, the upstream data output by the provider edge device;
mapping, by the provider edge routing device, the upstream data to a virtual address associated with a recipient identified by the physical address included in the upstream data; and
outputting, by the provider edge routing device, the upstream data for communication to the recipient.

9. The method of claim 7, further comprising:
identifying, by the provider edge device, a quality of service indication for the upstream data; and
scheduling, by the provider edge device based at least in part upon the identified quality of service, the upstream data for communication to the provider edge routing device.

10. A broadband communication system comprising:
a provider edge device configured to utilize a physical address to perform media conversion on data communicated between a customer device and a cable service provider head end system; and
a provider edge routing device separate from the provider edge device and configured to (i) receive downstream data to be communicated to the customer device, (ii) map the received downstream data to the physical address associated with the customer device, (iii) determine, based at least in part upon the physical address, a port for outputting the downstream data, (iv) determine a quality of service (QOS) indicator associated with the data, the QOS indicator being determined based on an evaluation of a designated recipient for the data, (v) identify a priority for communicating the downstream data to the physical address associated with the customer device using the QOS indicator associated with the downstream data, (vi) schedule, based at least in part on the identified priority, an output of the downstream data to the physical address associated with the customer device, and (vii) output, based at least in part on scheduling the output of the downstream data, the downstream data for communication to the customer device, wherein the downstream data is subsequently processed by the provider edge device.

11. The broadband communication system of claim 10, wherein the provider edge device is incorporated into a fiber optic node.

12. The broadband communication system of claim 10, wherein the provider edge device is incorporated into a hybrid fiber coaxial network configured to facilitate communications between the cable provider head end system and the customer device.

13. The broadband communication system of claim 10, wherein the provider edge device is further configured to utilize the physical address to identify an output port for the data.

14. The broadband communication system of claim 10, wherein the provider edge device comprises one of (i) a cable modem terminal system or (ii) a converged multi-service access platform.

15. The broadband communication system of claim 10, wherein the physical address comprises a media access control (MAC) address.

16. The broadband communication system of claim 10, wherein the provider edge routing device is configured to map the received downstream data from a virtual address to the physical address.

17. The broadband communication system of claim 10, wherein:
the provider edge device is further configured to (i) receive upstream data output by the customer device and (ii) provide the upstream data to the provider edge routing device; and
the provider edge routing device is further configured to (i) receive the upstream data, (ii) map the received upstream data to a virtual address associated with a designated recipient, and (iii) output the received data for communication to the designated recipient.

18. The broadband communication system of claim 17, wherein the provider edge device is further configured to mark the upstream data with a quality of service indication.

* * * * *